April 7, 1964  B. G. FRAZIER  3,127,961
STRUCTURAL ELEMENTS

Filed Aug. 4, 1959  2 Sheets-Sheet 1

INVENTOR
Bob G. Frazier

BY Mason, Fenwick & Lawrence
ATTORNEYS

April 7, 1964 B. G. FRAZIER 3,127,961
STRUCTURAL ELEMENTS
Filed Aug. 4, 1959 2 Sheets-Sheet 2

INVENTOR
*Bob G. Frazier*

BY *Mason, Fenwick & Lawrence*
ATTORNEYS

United States Patent Office 3,127,961
Patented Apr. 7, 1964

1

3,127,961
STRUCTURAL ELEMENTS
Bob G. Frazier, Dallas, Tex., assignor to Frontier Manufacturing Company, Dallas, Tex., a corporation of Texas
Filed Aug. 4, 1959, Ser. No. 831,671
2 Claims. (Cl. 189—34)

This invention relates to structural elements, and particularly to such elements which are pre-punched to provide pre-arranged bolt openings which will permit assembly of two or more of the elements in many different arrangements.

It has been proposed to provide structural members which are perforated along their lengths, so that the members can be interconnected by bolts, or similar fastening means, in a plurality of ways and at different points along the lengths of the members. While the members so far proposed have been capable of several different combinations and arrangements, the number of connections possible have been limited, and adjustment of the members relative to one another in most cases has been impossible. The member, or element, is usually of right angular cross-section having one wide and one narrow flange, and both flanges are punched, or drilled to provide bolt openings arranged according to a pre-conceived pattern.

The general object of the present invention is to provide structural elements of the above described type which will greatly facilitate the connection of the members and provide for increased variety in arrangement and connection of two or more members.

A more specific object is the provision of such members with a bolt opening pattern which will permit the use of more bolts per connection than with structural elements now used.

A further object is to provide members of this nature, wherein the openings of the punched pattern are so arranged that a joint between two of the members will be tightened when load is imposed upon it.

A still more specific object of the invention is to provide structural members of this kind having a balanced pattern of slots and holes with the basic pattern design involving arrangement of the slots and holes in V and inverted-V formations to provide a rectangular group or repeat pattern with the slots and holes intermingled.

Other objects of the invention will become apparent from the following description of practical embodiments thereof, when taken in conjunction with the drawings which accompany, and form part of, this specification.

2

Figure 10:
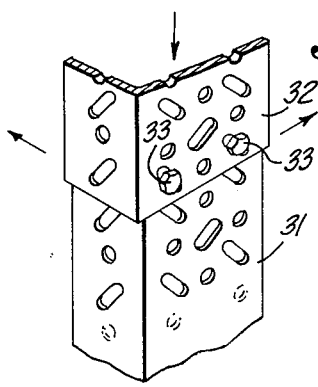

FIGURE 10 is a perspective view of two members joined in overlapped relation.

In general, the invention consists in an angle structural member having one wide and one narrow flange, with the two flanges being provided with a plurality of slots and holes arranged according to predetermined patterns which will permit matching up the openings of two or more members to receive bolts, or other fastening means, to connect the members in desired relation.

Figure 1:
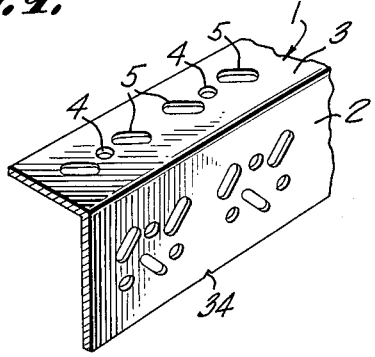
FIGURE 1 is a perspective view of a portion of a structural element constructed in accordance with the principles of the present invention.
Figure 2:
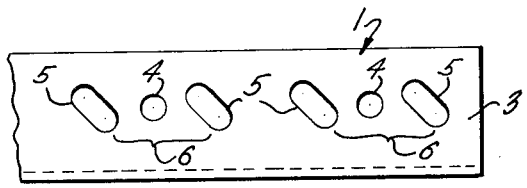
FIGURE 2 is a top plan view of the member shown in FIGURE 1, illustrating the arrangement of the openings on the narrow flange.
Figure 3:
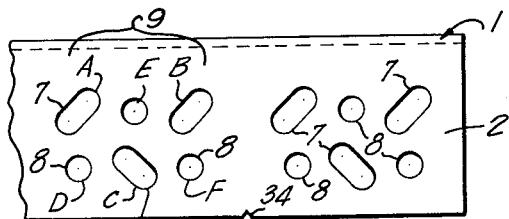
FIGURE 3 is a side elevation of the member shown in FIGURE 1, showing the opening design on the wide flange.

Referring to the drawings in detail, and first adverting to that form of the invention shown in FIGURES 1 to 3, the structural element is shown as an elongated member 1 of right-angle cross-section. The cross-sectional shape is actually in the form of an L, having a long leg, or wide flange, 2 and a short leg, or narrow flange, 3. Each of the flanges is perforated.

The narrow flange is provided with openings arranged to establish a pattern of alternating holes 4 and slots 5.

The slots are spaced equidistant along the full length of the member and positioned at angles of 45° to the longitudinal edges of the flange. Between each pair of slots 5 there is a round hole 4. This divides the openings into spaced groups 6, each consisting of two spaced slots and an intermediate hole. The pattern provides for rigid, accurate connection, by means of the holes, and connection allowing for longitudinal and transverse adjustment, by use of the angularly disposed slots. Flanges punched in this manner can be coupled in a great many ways to similar flanges of other elements and to the wide flanges of other elements, as will be described.

The wide flange of this form of the element is shown in FIGURE 3. On this flange there are two rows of openings, with the slots 7 and holes 8 of the top row arranged in groups in the same manner as in the narrow top flange. The slots, however, are inclined in the opposite direction. The bottom row of openings is spaced from the top row a distance equal to the spacing between openings and is reversed, that is, each group consists of two holes and a slot. The holes of the bottom row are positioned directly under the slots of the upper row, and the slots beneath the holes. It will be noted that the slots of the bottom row are reversely inclined to those of the top row. The pattern thus provided consists of rectangular groups 9 of openings, each including six openings. Each group has three slots arranged to lie at the corners of an inverted triangle ABC, and three openings at the corners of a triangle DEF. The apex of each triangle lies in the base of the other triangle. This pattern has the appearance of a herringbone design, particularly in the arrangement and disposition of the slots. It permits connection to other similar members in almost universal fashion due to the staggered arrangement of the holes and slots and the reverse inclination of the slots.

Figure 4:
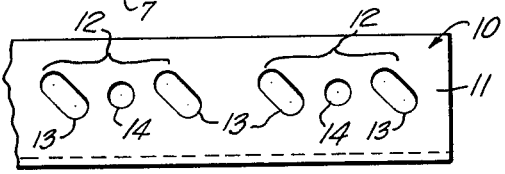
FIGURE 4 is a top plan view of a structural member of larger dimensions than that of FIGURES 1 to 3.
Figure 5:
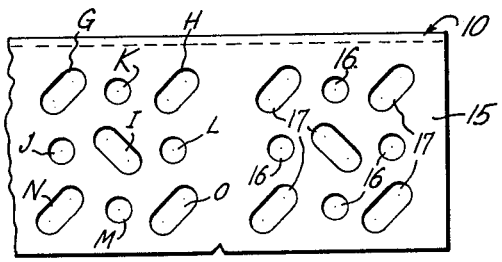
FIGURE 5 is a side view of the opening arrangement of the wider flange of the larger member.

The opening pattern of the structural element 10, shown in FIGURES 4 and 5, is designed for larger angle members. Here, the narrow flange 11 is provided with groups 12 of slots 13 and holes 14 arranged in exactly the same manner as those in the narrow flange of the member previously described.

The wide flange 15, shown in FIGURE 5, differs from the wide flange of the first form in that there are three rows of openings. The holes 16 and slots 17 of the top and intermediate rows are precisely the same as in the smaller angle. The slots of each group 18 lie at the corners of an inverted triangle GHI, while the holes are at the corners of the triangle JKL. The third, or bottom, row is a duplicate of the top one, and the openings directly underlie those of the top row. The center row openings are common to the triangles formed by the openings of the top and middle rows and to second triangles formed by the holes of the center and bottom rows. The holes form a second triangle JLM having a common base JL with the triangle JKL. The slots form a second triangle NIO which has its apex coincident with the apex of the triangle GHI. Thus, the four holes provide a diamond pattern with the slots arranged to form an X, and the legs of the X being parallel to the sides of the diamond and intersecting opposite sides of the diamond at their centers. In this form, the herringbone effect is more pronounced.

Figure 6:
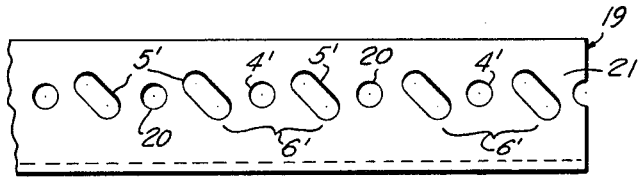
FIGURE 6 is a top plan view of an element illustrating a modified opening design on the narrow flange.
Figure 7:
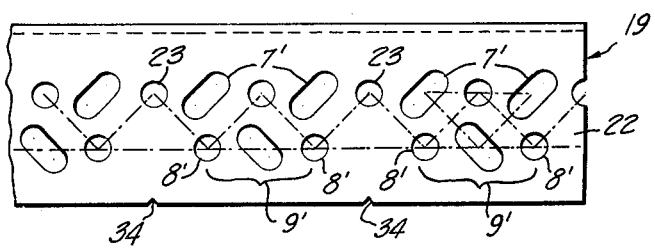
FIGURE 7 is a side view showing the modified arrangement on the wide flange.

FIGURES 6 and 7 show a small angle member 19 such as that shown in FIGURES 1 to 3 with a slightly modified perforation pattern. The rectangular groups of openings are present as before, but additional holes are provided intermediate the groups on both flanges. The openings of the member 19 corresponding to the openings of the member 1 of FIGURES 1 to 3 are given the same numerals as in FIGURES 1 to 3 with the addition of a prime.

The addition of holes 20 in the narrow flange 21 of member 19 (FIGURE 6) provides a uniform alternation of slots and holes, with all of the openings uniformly spaced apart, along the full length of the member. The added openings will give greater latitude for variety of connection between members.

In the wider flange 22 (FIGURE 7) additional holes 23 are punched in alignment with the top row of openings only. These holes are positioned centrally between the rectangular groups of openings. It will be seen from FIGURE 7 that the hole pattern of this modification forms a series of triangles interconnected at their base angles, with the holes of the bottom row providing common base corners for adjacent triangles. The slots, as before, provide an inverted triangular pattern overlying the hole pattern in the group area.

Figure 8:
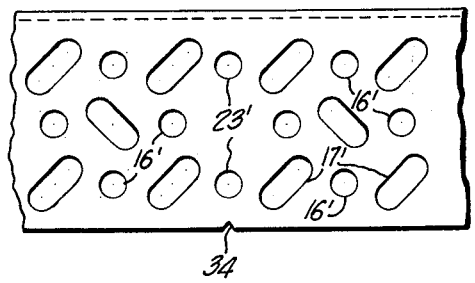
FIGURE 8 illustrates a fragment of a large angle having additional openings similar to the form shown in FIGURES 6 and 7.

It will be obvious that the larger angle members having the three rows of slots can also be provided with additional holes 23' between the groups of openings, as shown in FIGURE 8. In this case the additional openings will be in alignment with the top and bottom rows of openings.

Figure 9:
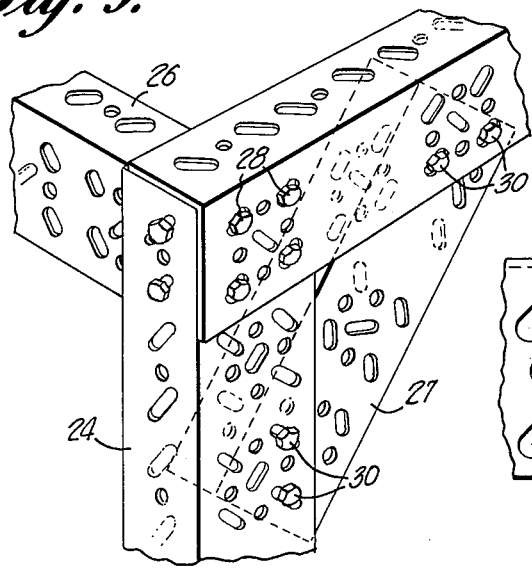
FIGURE 9 is a perspective view showing several sections joined to form a corner with a brace.

FIGURE 9 illustrates a typical frame corner constructed from several of the members. There is shown a vertical post 24, top frame members 25 and 26, and a diagonal corner brace 27. The larger angle members of the type shown in FIGURES 4 and 5 are illustrated. It will be seen that the wide flanges of the members 24 and 25 overlap. The square groups provided by the three row opening design permit the four corner slots of the overlapping groups to coincide so that four fasteners 23 may be used. The overlying slots will permit vertical as well as horizontal adjustment in the event members are not cut off at exactly the right points. The narrow flange of the post 24 is shown overlapping the wide flange of the top member 26. Here again, the slot arrangement will provide for plural fastening, as shown by the fasteners 29. The same adjustment provision is present here also. The fact that the rows of openings are equally spaced and the openings are similarly spaced in the rows causes the triangles previously described to be isosceles triangles, which will ensure the diagonally arranged openings to lie parallel to the edges of another member when the two are positioned at 45° to one another. Thus, maximum fastening may be made at all times. In FIGURE 9 two fasteners 30 are shown in each end of the diagonal brace 27.

In FIGURE 10 two members are shown arranged end to end with their end sections overlapping. Here again, maximum fastening can be had due to the registering of the openings. It will be obvious that the adjustment permitted by the slots will allow the registration of the slots of overlapped members with one another, or slots to register with holes, even though the members are necessarily offset when overlapped a distance equal to the thickness of the metal. When two members are connected vertically, as the members 31 and 32 of FIGURE 10, the imposed load will cause the bolts 33, or other fastening means, to act upon the inclined surfaces of the slots to draw the two members into binding relation.

In order to assure proper connection between members, the elements are marked by notches 34, or other means, to indicate lines along which the members may be cut. The marks will be midway between groups of openings so that similar spacing will be had in all cases.

It has been found that in order to provide for maximum adjustment, and at the same time maintain requisite strength in the elements that the slots should be relatively short. A slot length of twice the diameter of the holes has been found to provide the best results.

Structural angle members provided with openings in the basic pattern disclosed, that is, rectangular groups composed of groups of holes and inclined slots with the holes and slots arranged in reversely interlocking triangular design, have been found to permit a greater variety of arrangements than any of the other opening patterns now known. At the same time, there will be more registration of openings in all arrangements, affording increased opportunity for securing the members together. Those features result in a wider range of use of the members, ease of construction with the members, and more rigid structures composed of such members.

While in the above practical embodiments of the invention have been disclosed, it will be understood that the specific details described and illustrated are merely by way of example, and the invention is to be limited only by the scope of the appended claims.

What is claimed is:

1. A structural element comprising, an elongated member of right angle cross-section having a wide flange and a narrow flange, longitudinally spaced rectangular groups of openings in the wide flange, each group including a plurality of slots which are inclined at a 45° angle to the longitudinal axis of the wide flange and a plurality of holes, the minor dimension of the slots corresponding to the diameter of the holes, and to the cross-sectional diameter of fasteners to be received therethrough, the slots of a group being positioned at the corners of at least one triangular arrangement and the holes of a group being positioned at the corners of at least one triangular arrangement overlying and inverted with respect to the triangular arrangement of the slots, the opening at the apex of each triangular arrangement of openings lying in longitudinal alignment with the openings at the base corners of the overlying triangular arrangement of openings, and the slot at the apex of the triangular arrangement of slots positioned so that its major axis projected bisects the major axis of the slot at one base corner and the major axis projected of the slot at the other base corner of the triangular arrangement of slots bisects the major axis of the slot at he apex, whereby the slots of said wide flange and the holes of the wide flange of a like companion structural element intersect to provide fastener receiving openings coextensive with said holes at a plurality of different relative longitudinal overlapped conditions of said wide flanges when the first mentioned and companion structural elements are in similarly oriented, longitudinally aligned, lapped relation and whereby the slots of the wide flanges of said first mentioned structural element and a like companion structural element intersect to provide fasener receiving openings over a series of interrupted ranges of relative longitudinal adjustment of said structural elements when the structural elements are arranged with their wide flanges in aligned abutment and their narrow flanges extend oppositely in coplanar relation.

2. A structural element comprising, an elongated member of right angle cross-section having a wide flange and a narrow flange, longitudinally spaced rectangular groups of openings in the wide flange, each group including three longitudinal rows of openings spaced transversely of the wide flange, each row including three openings spaced longitudinally of the wide flange, the openings of the group comprising a plurality of slots which are inclined at a 45° angle to the longitudinal axis of the wide flange and a plurality of holes, the minor dimension of the slots corresponding to the diameter of the holes, and to the cross-sectional diameter of fasteners to be received therethrough, with the slots and holes arranged in alternation in the group both longitudinally and transversely of the flange, the outside longitudinal rows of the group having end slots and an intermediate hole, and the intermediate longitudinal row having end holes and an intermediate slot inclined reversely to the slots of the outside longitudinal rows, with the projected major axis of the center slot bisecting the major axes of the slot at one end of one outside longitudinal row and the slot at the opposite end of the other outside longitudinal row, and the major axes of the remaining two slots being in alignment with one another and bisecting the major axis of the center slot, whereby the slots of said wide flange and the holes of the wide flange of a like companion structural element intersect to provide fastener receiving openings coextensive with said holes at a plurality of different relative longitudinal overlapped conditions of said wide flanges when the first mentioned and companion structural elements are in similarly oriented, longitudinally aligned, lapped relation and whereby the slots of the wide flanges of said first mentioned structural element and a like companion structural element intersect to provide fastener receiving openings over a series of interrupted ranges of relative longitudinal adjustment of said structural elements when the structural elements are arranged with their wide flanges in aligned abutment and their narrow flanges extend oppositely in coplanar relation.

References Cited in the file of this patent

UNITED STATES PATENTS

| | | |
|---|---|---|
| 2,733,786 | Drake | Feb. 7, 1956 |
| 2,990,920 | Hoffman | July 4, 1961 |

FOREIGN PATENTS

| | | |
|---|---|---|
| 1,098,263 | France | Mar. 2, 1955 |
| 763,214 | Great Britain | Dec. 12, 1956 |
| 800,231 | Great Britain | Aug. 20, 1958 |
| 1,169,641 | France | Sept. 15, 1958 |
| 1,187,190 | France | Mar. 2, 1959 |